United States Patent

[11] 3,549,851

| [72] | Inventors | Terry O. Hockenberry;<br>Everard M. Williams, Pittsburgh, Pa. |
|---|---|---|
| [21] | Appl. No. | 602,724 |
| [22] | Filed | Dec. 19, 1966 |
| [45] | Patented | Dec. 22, 1970 |
| [73] | Assignee | Siltronics, Inc.<br>Oakmont, Pa.<br>a corporation of Pennsylvania |

[54] POWER SUPPLY CIRCUITRY FOR INCREASING CAPACITANCE-CHARGING RATE AND DISCHARGE DURATION IN ELECTRIC DISCHARGE MACHINING APPARATUS
21 Claims, 11 Drawing Figs.

[52] U.S. Cl. ..................................... 219/69,
315/227; 320/1
[51] Int. Cl. ..................................... B23p 1/08,
H02n 11/00
[50] Field of Search ........................... 219/69P,
69C, 69G; 315/227.1; 320/1

[56] References Cited
UNITED STATES PATENTS

| 2,756,316 | 7/1956 | Teubner | 219/69(C) |
| 3,054,931 | 9/1962 | Inoue | 219/69(P)X |
| 3,098,149 | 7/1963 | Inoue | 219/69(P) |
| 3,259,795 | 7/1966 | Schierholt | 219/69(C)X |

FOREIGN PATENTS

| 624,284 | 7/1961 | Canada | 219/69(P) |

*Primary Examiner*—R. F. Staubly
*Attorney*—Buell, Blenko & Ziesenheim

ABSTRACT: An electric discharge machining system having circuit means for charging a capacitance from a source of unidirectional potential and a charging impedance network in series with said capacitance. The impedance network includes a slower charging impedance capable of charging said capacitance at a slow rate while said gap is deionizing and a faster charging impedance coupled in parallel therewith. An electric switch is coupled in series with said faster charging impedance, and is controlled by a circuit coupled to said switch and to said tool and workpiece for closing said switch when said gap has deionized sufficiently following each discharge thereacross to permit a faster capacitance charging rate. There is also disclosed a time-variable network coupled to the control electrode of the electronic switch for prolonging the machining pulse to achieve a remarkably faster machining rate.

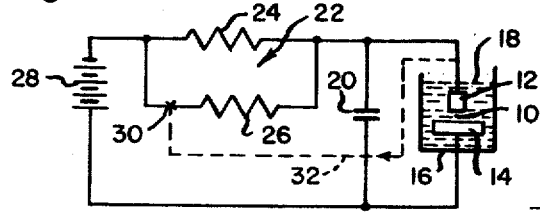
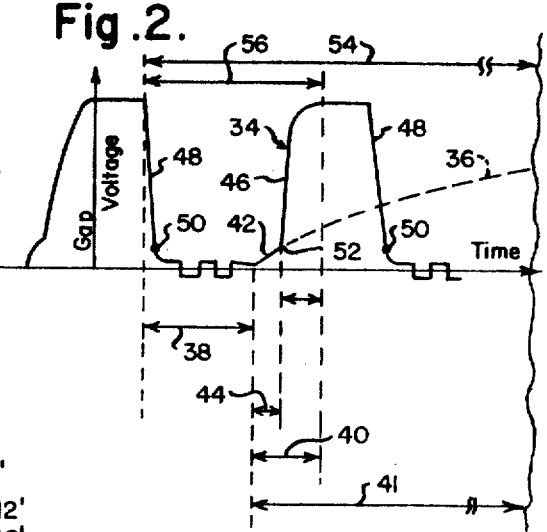
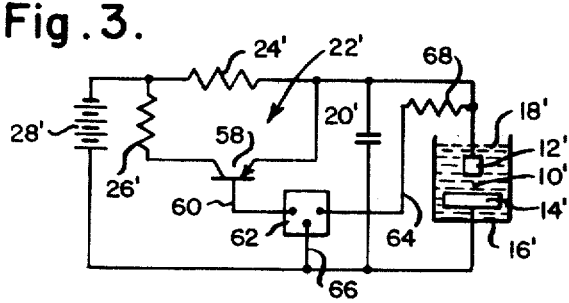
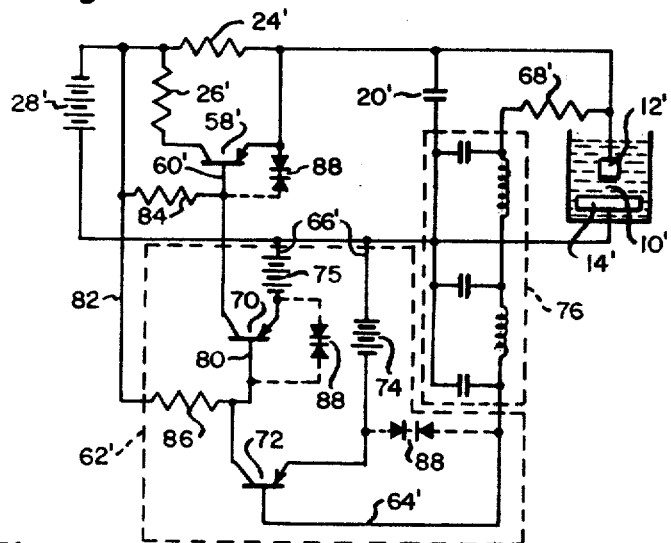
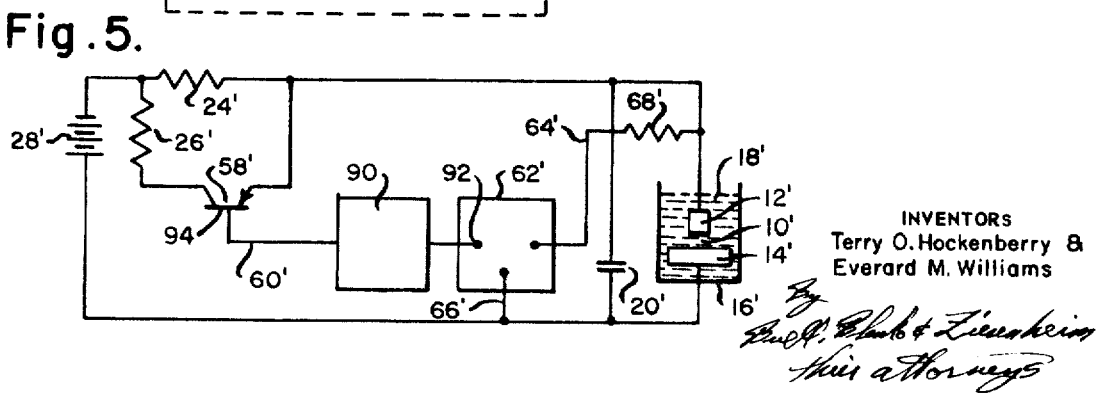
INVENTORS
Terry O. Hockenberry &
Everard M. Williams

PATENTED DEC22 1970

INVENTORS
Terry O. Hockenberry &
Everard M. Williams

INVENTORS
Terry O. Hockenberry &
Everard M. Williams

POWER SUPPLY CIRCUITRY FOR INCREASING CAPACITANCE-CHARGING RATE AND DISCHARGE DURATION IN ELECTRIC DISCHARGE MACHINING APPARATUS

The present invention relates to charging or current-limiting circuitry primarily for electric discharge machining (EDM) apparatus, and more particularly to circuitry of the character described including circuit means for increasing the charging rate of capacitance means usually coupled across the discharge gap of EDM apparatus, means for preventing the development of sustained arcing across the discharge gap of the apparatus, and/or means for increasing the duration of the cutting pulse of each gap discharge.

Although our present invention is described in connection with EDM applications, it will be evident as this description proceeds that the invention is of general utility in the charging of electric storage devices, such as capacitors or chargeable inductances. Moreover, the invention is generally useful in current-limiting applications wherein it is desired to provide circuit means for shifting rapidly between higher and lower current conditions, and particularly for fluctuating cyclically and/or respectively between such conditions.

In the electric discharge machining process, an electrically conductive workpiece is immersed in a bath of dielectric liquid, such as kerosene, while an electric tool is extended into the bath and is advanced toward the workpiece. The electrode tool is provided with a profile similar to that of the desired shape. In this connection, any desired shape can be imparted to the electrode tool and can be selected from geometric and nongeometric or other irregular configurations. Moreover, a design can be cast or otherwise imparted to the face of the electrode tool, which will then be oppositely reproduced on the workpiece surface. Depending upon the specific application, the electrode tool can be provided with a number of electrode tips for simultaneously machining a number of such designs on the same or respectively separate workpieces.

An electric potential difference is applied between the tool and the workpiece and when the former is advanced so that the spacing becomes sufficiently small there is a breakdown of the dielectric interposed between the tool and the workpiece. This breakdown is usually termed "spark over", hence the term "spark machining", sometimes applied to the EDM process, and is followed by an arc discharge of very short duration of, at the most, a few milliseconds. Then the arc ceases, permitting the discharge path to be de-ionized and to restore the insulating property of the dielectric liquid. As a result of the arc discharge, a tiny crater is formed in the workpiece while a second small crater is formed in the tool. In the working process, the tool is continuously advanced toward the workpiece to permit repetitive and closely spaced but intermittent discharges, and ultimately the desired shape of the hole or cavity is formed in the workpiece.

When the gap between the electrode and the workpiece is reduced to a sufficiently small value, in certain applications of the order of 0.003 inches per 100 volts, the dielectric breaks down and an arc discharge takes place. The range of working voltages in production machines presently in use varies from approximately 40—400 volts. Oscillographic measurements of typical discharges from such EDM machines show that the discharges are oscillatory in nature, and typical spark repetition rates presently range from 50—1,000,000 discharges per second. The detached fragments of the workpiece and electrode material are removed by the dielectric flow resulting from local pressures caused by the localized explosiveness of the arc discharges. This removal can be augmented by forced circulation of the dielectric fluid.

In the EDM process, the erosion, or the sum total of the spark-induced craters, is greatest at the positive electrode, i.e., at the workpiece surface. The EDM process evidently, then, is quite different from arc cutting systems in which the greater erosion takes place at the negative electrode. Arc erosion is accompanied by high temperatures and melting, whereas in spark erosion there is little evidence of the existence of elevated temperatures and melting of the workpiece surface.

Ideally, the EDM process is conducted with as high a discharge recurrence rate as is feasible without developing sustained arcing. This is necessary in order to achieve requisite machining speeds without damage to the workpiece and electrode tool. However, conventional power supplies, which are usually of the relaxation type, are limited in discharge frequency by the conventionally established R-C time constants thereof.

The basic form of such power supply is known as the Lazarenkos circuit and consists of a resistance and capacitance in series-parallel with the discharge gap and with the source of DC or unidirectional potential. This power supply is simple, rugged and capable of satisfactory performance in many applications. However, it limits the frequency of the gap discharges produced thereby without adequately limiting short circuit current, and exhibits tendencies to develop sustained arcing conditions which damage the workpiece and overheat the electrode tool.

In order to prevent sustained arcing, the resistance of conventional supply circuits for EDM apparatus must be sufficiently high so that the steady-state current therethrough, i.e., when the discharge gap is short circuited, is insufficient for the development of sustained arcing across the discharge gap when not otherwise shorted. The charging resistance must also be sufficiently high that the capacitance charges sufficiently slowly to permit the discharge gap to de-ionize sufficiently after each discharge before the capacitance voltage builds up to the point where it would otherwise produce a sustained arc across an ionized or partially ionized gap. Sustained arcs, of course, would be ineffective in removing material from the workpiece. However, this necessarily slow charging rate of conventional circuitry imposes a limit upon the maximum gap discharge frequency and hence upon the speed of the discharge machining process. Moreover, because the charging resistance of the conventional relaxation circuit must be set rather high, the rate of capacitance charge becomes even slower as the discharge point is approached even though the discharge gap has long since recovered or de-ionized, relatively speaking.

On the other hand, under certain EDM conditions, there is an advantage to machining with a relatively long duration cutting pulse. For example, a higher metal removal rate of a tool steel workpiece, for example, can be obtained with a long duration pulse (in the range of milliseconds, for example) than with a short duration pulse (in the range of microseconds), even though the power input to the machining gap in both cases is the same. When using either long duration pulses or the conventional short duration pulses, it is desirable to shorten the capacitance charging time, as described below.

In overcoming these problems of the prior art, we have discovered that the discharge gap recovery is substantially completed, in a typical example, after the capacitance or other electric storage means voltage has risen to about 20 volts. Unfortunately, the capacitance of a conventional circuit continues its relatively slow rate of charge thereafter until the capacitance attains its maximum charge of between 100 and 400 volts, in typical present-day applications. Moreover, the rate of capacitance charge becomes increasingly slower in accordance with well-known time curves as outlined in greater detail below.

Our novel power supply and power circuitry disclosed herein overcomes these difficulties by providing a pair of charging elements or resistances for the capacitance. In one arrangement of the invention, one of the charging elements, which can be termed a "pilot resistor", or slower charging resistance, establishes with the capacitance an RC characteristic having a conventional charging time such as that employed in the usual power supply circuit. A second charging element, which may be termed a "power charging resistor", or faster charging resistance, is coupled into the power supply circuit in parallel with the pilot charging element. The second element is automatically switched into the power supply circuit after each gap discharge in order to increase the rate of the capacitance charging after the gap recovery is substantially completed following each discharge thereacross. In one example of our novel circuitry, the power charging resistance is switched in after the gap voltage has risen to about 20 volts.

The switching means for the power charging element is related through suitable circuit means to the discharge gap so that the switching means is automatically turned on upon recovery of the gap following each gap discharge, during which elapsed time, the capacitance is charged at the conventional rate in order to allow sufficient time for the gap to de-ionize. In an exemplary arrangement of the novel supply circuit the aforementioned switching means is related to gap voltage or the voltage across the charging capacitance and is triggered on when the extent of gap recovery permits the gap voltage to rise to a predetermined amount during the preliminary, slow charging rate portion of the capacitance charging cycle.

Owing to the extreme repetition rate or frequency of the gap discharges, which may be in the order of 100,000 discharges per second in conventional, fine machining processes, it is necessary for most applications of our circuitry to utilize switching means which can be operated rapidly and at a very high repetitive rate. Accordingly, such switching means for such applications must be electronic in nature, for example, a semiconductor device such as a transistor or silicon-controlled rectifier, or a gaseous electronic tube such as a thyratron, or a mercury arc device. For the faster discharge rates the aforementioned semiconductor devices are preferable.

We also provide circuit means, which can be associated with the aforementioned dual charging arrangement if desired, for flowing a sustaining current from the potential source and across the EDM gap for a predetermined time interval following each capacitance discharge, to provide the aforementioned long duration cutting pulses.

During the foregoing discussion, certain objects, features and advantages of the invention have been alluded to. These and other objects, features and advantages of the invention will be elaborated upon during the forthcoming description of certain presently preferred embodiments of the invention, together with preferred methods of practicing the same.

In the accompanying drawings, we have shown certain presently preferred embodiments of the invention and have illustrated certain presently preferred methods of practicing the same wherein:

FIG. 1 is a schematic circuit diagram of a basic form of our supply circuit for EDM apparatus and illustrating one arrangement of current limiting means for effecting a dual charging rate for the discharge capacitance or the like;

FIG. 2 is a graphical representation illustrating the improvement in capacitance charging time and repetitive discharge rate effected by our invention;

FIG. 3 is a schematic circuit diagram of another arrangement of supply circuitry of the invention incorporating the use of semiconductor switching means;

FIG. 4 is a schematic circuit diagram incorporating one form of keying circuit for extremely rapid operation of the switching means of FIG. 3 and arranged in accordance with our invention;

FIG. 5 is a schematic circuit diagram incorporating keying and sustaining circuit means and representing another form of the supply circuit of the invention;

FIG. 11 is a graphical representation of the operation of the current limiting means of FIG. 10.

Figure 6:
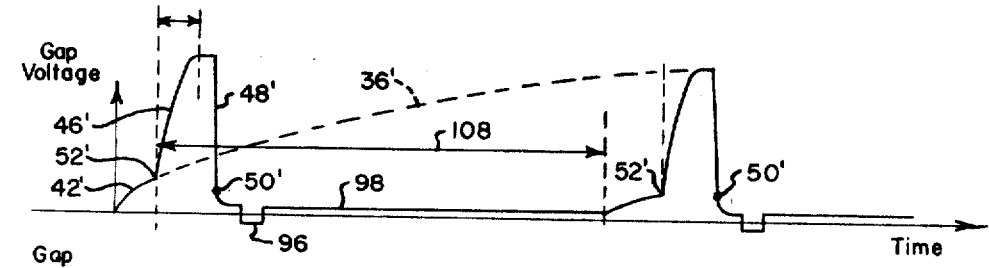
FIG. 6 is a graphic representation of gap voltage vs. time when the supply circuit of FIG. 5 is used in the operation of EDM apparatus.

Referring now to FIG. 1 of the drawings, the exemplary power supply circuit illustrated therein is arranged in accordance with the invention for controlling spark discharges across a discharge gap 10 which is normally provided between an electrode tool 12 and workpiece 14 forming part of EDM apparatus. The tool 12 or that part which is adjacent the workpiece 14, and the workpiece are immersed within a tank or suitable container 16 which contains a liquid dielectric medium such as kerosene 18. When the voltage of capacitance 20 is sufficient to break down the dielectric in the discharge gap 10, spark discharges are initiated which effect erosion of the workpiece 14 in the known manner.

The tool 12 can be positioned automatically by suitable positioning mechanism and circuitry, for example, that described and claimed in our copending application entitled "Electrode Positioning Control for Electric Discharge Machining", Ser. No. 602,722, and filed concurrently herewith.

The capacitance 20, in this example, is charged at different times in its charging cycle by resistance network 22 which includes a pilot or slower charging resistance 24 and a power or faster charging resistance 26. The resistance network 22 and the capacitance 20 are coupled in series-parallel with the discharge gap 10 and with a source of DC potential represented here by battery 28.

The resistance network 22, which includes a switch denoted generally by reference character 30 in series with the power charging resistance 26, is arranged to provide a relatively higher RC constant with the capacitance 20 to effect a slower capacitance charging rate during the initial portion of its charging cycle during which portion sufficient time elapses to permit the discharge gap 10 to de-ionize or the recover. Subsequently the resistance network 22, through suitable operation of the switch 30, imposes a faster charging rate upon the capacitance 20 during the remainder of each capacitance charging cycle. The imposition of dual charging rate upon the capacitance 20 by the resistance network 22 follows each spark discharge across the gap 10. A primary result of the dual charging rate is the charging of the capacitance 20 in a fraction of the time required by a conventional relaxation-type power supply. Thus, the elapsed time between consecutive gap discharges or sparkovers can be correspondingly decreased.

In accordance with the invention, the pilot resistor 24 desirably is provided with the conventional resistance value, which is sufficiently high to prevent sustained arcing across the discharge gap 10 even at gap-shorted currents and is also sufficiently high to prevent the capacitance 20 from charging at a faster rate than that at which the gap 10 can de-ionize On the other hand, the power charging resistance 26 is not subject to these limitations since it is only intermittently coupled into the power supply circuit by the switch means 30. When the switch means 30 are actuated, the power charging resistor 26 is connected in bypassing relationship with the pilot resistance 24. Accordingly, the resistance value of the power charging resistor 26 can be set at a point low enough to obtain a desired high charging rate for the capacitance 20. If desired, either or both of the pilot and power charging resistors 24, 26 can be replaced by suitable variable resistors (not shown).

The switch means 30 are actuated to couple the power charging resistance 26 into the power supply circuit only after the discharge gap 10 has sufficiently de-ionized or recovered that a rapid voltage buildup in the capacitance 20 will not effect a sustained arc across the gap 10. In this arrangement, the switching means 30 are actuated after the gap de-ionizes following each gap discharge by suitable circuit means denoted generally by the dashed conductor outlines 32 which are coupled across the discharge gap 10 and are arranged to sense the de-ionization thereof, as denoted for example by rise in gap voltage to a predetermined level.

The circuit means 32 are also arranged to open the switch means 30 as soon as the discharge gap 10 becomes ionized during sparkover in order to decouple the power charging resistance from the power supply circuit. Therefore, the relatively lower resistance of the power charging resistance 26 cannot be used to bypass current continuously around the pilot resistance 24 at a current level that would otherwise permit development of sustained arcing across the discharge gap 10. As a result, satisfactory gap recovery and prevention of sustained arcing characterized by use of a high charging resistance are retained, while the faster charging rate and hence higher repetitive discharge rate of the lower charging resistance are added by the novel power supply circuitry disclosed herein.

With reference now to FIG. 2 of the drawings, the improvement in capacitance charging time and in repetitive discharge rate wrought by the invention, is illustrated by a typical gap voltage curve 34 produced by our novel power supply circuitry, in comparison with a gap voltage curve 36 typically produced by conventional relaxation-type power supplies. Specifically, the curve 34 represents the gap voltage history ensuing from the operation of the dual resistance network 22, such as illustrated in FIG. 1.

In FIG. 2, the typical discharge or cutting time of a single group of pulses following each gap discharge is denoted by dimensional arrow 38, and the first such discharge period is substantially the same for either curve 34, or 36. On the other hand, the ensuing total charging time tokened by our novel power supply following each pulse is denoted by arrow 40, while the total charging time consumed by a typical, conventional power supply is represented by the much longer dimensional arrow 41.

During the initial portion of the charging time, the charging rate of our novel power supply follows portion 42 of the gap voltage curve 34 which also denotes the initial portion of the charging portion of gap voltage curve 36 during which the pilot resistance 24 is operative. This also represents the recovery period, denoted by arrow 44 of the discharge gap 10, during which period the gap 10 has de-ionized sufficiently to permit further and much more rapid charging of the capacitance 20 (FIG. 1). At the end of the recovery period, switch means 30 are actuated to switch the power charging resistance 26 into the power circuit in order to commence the steeper charging rate portion 46 of the gap voltage curve 34 to rapidly terminate the charging period 40.

When the subsequent sparkover occurs, as denoted by curve portion 48, the gap voltage rapidly falls to point 50 which is substantially equal to the gap voltage at knee 52 of the charging portion of curve 34, at which time the switch means 30 are opened to decouple the power charging resistance 26 and to reinstate the current limiting characteristic of the pilot resistance 24.

In a conventional power supply circuit, i.e., when not using the power charging resistance 26 and the switch means 30, the capacitance charging rate would follow that indicated by an extrapolation of the gap voltage curve portion 42, which coincides with the conventional gap voltage curve 36. A glance at FIG. 2, will, therefore, indicate the much larger required charging time and attendantly increased time gap between adjacent sparkovers as denoted by dimensional arrow 54. The improvements in capacitance charging time and in discharge frequency, on the other hand, are denoted by dimensional arrow 56.

Turning now to FIG. 3 of the drawings, our power supply circuitry as disclosed therein includes a resistance network 22' wherein the power charging resistance 26' is repetitively switched into the power supply circuit by means of a switching transistor 58 which performs the function of the switching means 30 described above in connection with FIG. 1. In this example, the transistor 58 is a power transistor, although it will be understood that other suitable semiconductor devices can be utilized.

The transistor 58 in this example, is repetitively turned on each time the gap 10' has recovered following the respective gap discharges. Turning on the transistor 58 is effected, in this example of the invention, by the corresponding application of a sufficiently negative potential to the base of the transistor 58 through conductor 60. One arrangement for supplying such potential to the transistor base is accomplished repetitively by means of a keying circuit denoted generally by reference character 62 and coupled across the discharge gap 10' by means of conductors 64 and 66, with a current limiting resistance 68 being coupled, in this example, in the conductor 64. In one arrangement of the keying circuit 62, which is shown and described in detail in connection with FIG. 4 of the drawings, the circuit 62 is arranged to deliver appropriate actuating pulses to the base of the transistor 58 when the gap voltage has risen, in this arrangement, to about 20 volts, at which point the discharge gap has sufficiently de-ionized or recovered in most EDM arrangements to permit rapid build up of capacitance or gap voltage without fear of sustained arcing. The output pulses of the keying circuit respectively span in time duration, the times during which the capacitance 20' is undergoing its rapid or power charging denoted by curve portion 46 of the gap voltage curve 34 (FIG. 2), and until the gap voltage again falls to about 20 volts during the ensuing sparkover, as denoted by point 50 of the gap voltage curve 34.

With reference now to FIG. 4 of the drawings, a detailed supply circuit of the invention including one detailed form of the keying circuit 62' shown generally at FIG. 3, is illustrated. In this example of the invention, the keying circuit 62' includes a pair of transistors 70 and 72 coupled in a common-emitter circuit, with each of their emitters being provided with biasing DC potentials represented by batteries 74 and 75. The batteries 74 and 75 are coupled to the transistors 70, 72 so as to be in bucking relation to the supply potential source 28', when the transistors 70, 72 are alternately rendered conductive. Thus, the batteries 74 and 75 are arranged to determine the gap voltage at which the keying circuit 62' becomes effective.

Input signals to the keying circuit 62' are related to gap voltage fluctuations through conductors 66' and batteries 74 and 75, and through conductor 64'. In addition to the aforementioned current-limiting resistance 68', the conductor 64' also includes, in this example, a low-pass filter denoted generally by reference character 76 and including conventionally arranged circuit elements to segregate the higher frequency oscillations of the gap discharges from the keying circuit 62'.

The input signals for the keying circuit, therefore, are applied to the base of transistor 72 and biasedly to the emitters of transistors 70 and 72.

The base of the keying transistor 70 is coupled through conductor 80 to the collector of the keying transistor 72. A base bias or negative reference potential is supplied to each of the switching transistor 58' and the keying transistor 70 through branched conductor 82, which is connected to base conductors 60' and 80, respectively. The conductor 82 is coupled to the aforementioned transistor base conductors through biasing resistances 84 and 86, respectively, in order to supply the proper reference voltages from the negative terminal of the main voltage source 28'. In this example, each of the transistors 58', 70, 72, are provided with a protective circuit each including a pair of reversed diodes 88, which can be of the Zener type, in order to limit the maximum base-to-emitter voltages and to avoid damage thereby to the associated transistors.

In operation, according to the present understanding of the invention, after each gap discharge or sparkover, when the gap voltage is approximately zero, the base of the keying transistor 72 is then at a more positive potential relative to its emitter. At such times, the keying transistor 72 is cut off, and there is no appreciable emitter-collector current therethrough. As a result, the collector of the transistor 72 assumes the negative potential of the power supply 28', which is coupled thereto through the branched conductor 82 and load resistance 86. This same relatively high, negative potential is applied to the base of the other keying transistor 70 through conductor 80, which as a result is then "turned on" and consequently can carry a high emitter-collector current, therethrough such that its emitter bias (battery 75) opposes the base bias across resistor 86, and therefore, its collector is at a low, negative potential.

The low, negative potential of the collector of the keying transistor 70 is applied through conductor 60' to the base of the switching transistor 58' and as a result the switching transistor 58' is biased to cutoff. This condition attains from the first point 50 on the discharge portion of the gap voltage curve 34 to the knee 52 of the charging portions 42, 46 of the curve 34 (FIG. 2).

At the knee 52 of the curve 34, the discharge gap 10' has substantially recovered or de-ionized, as described previously. The gap voltage at this time is sufficiently high in a negative direction that sufficient negative potential is applied to the base of the keying transistor 72, and its resultant emitter-collector coupling rapidly decreases the negative potential applied to the base of the other keying transistor 70, owing to the then coupled, opposed base bias (resistance 86) and emitter bias (battery 74). The transistor 70 is then biased to cutoff, and the attendant elimination of its collector current causes the main supply potential to be applied to the base of the switching transistor 58' by means of the branched conductor 82 and resistance 84. The switching transistor 58' is then turned on to couple the power charging resistance 26' into the supply circuit in bypassing relation to the pilot resistance 24', during the time period represented by charging curve portion 46 of FIG. 2.

The gain of the paired keying transistors 70, 72 is sufficiently high that the turnon and cutoff of the switching transistor 58' are tantamounk to on-off switching actions. The switching transistor 58' then remains on during the remainder of each capacitance charging cycle until it is again turned off when the gap voltage drops to that represented by the points 50 of the gap voltage curve 34 (FIG. 2).

Referring to FIG. 5 of the drawings, another form of the discharging circuit of the invention is disclosed therein, wherein similar reference characters with primed accents denote similar components of the preceding figures of the drawings. In the latter arrangement of the invention a pulse-prolonging circuit denoted generally by the reference character 90 is coupled to the switch means 30 (FIG. 1), for example the switching transistor 58 (FIG. 3). When the keying circuit 62' is utilized, as shown in FIG. 5, the pulse-prolonging circuit 90 is coupled in series with the output 92 of the keying circuit and the base 94 of the switching transistor 58'. The pulse-prolonging circuit 90 is turned on substantially simultaneously with the leading edge of the keying circuit output pulse.

In accordance with this form of our charging circuit, the pulse-prolonging circuit 90 is rendered operative upon receiving an output pulse from the keying circuit 62' when transistor gap 10' has recovered as aforesaid, and this operation of the pulse-prolonging circuit 90 continues for a predetermined interval after each pulse to maintain the base 94 of the switching transistor 58' sufficiently negative so that current continues to flow through the emitter-collector circuit of the switching transistor means 58'. The pulse-prolonging circuit 90 is arranged so that it delivers an output along conductor 60' during such interval, in the initial part of which the capacitance 20' is charged by the more rapid rate and subsequently discharges. However the pulse-prolonging circuit continues to supply an output for an additional predetermined interval portion following each discharge of the capacitance 20'. The pulse-prolonging circuit 90, then, effectively prolongs the actual discharge across the EDM gap 10' following each capacitance discharge. Thus, while the repetitive discharge rate is reduced, the effective spark-cutting time or the discharge current duty-cycle is actually increased.

Figure 7:
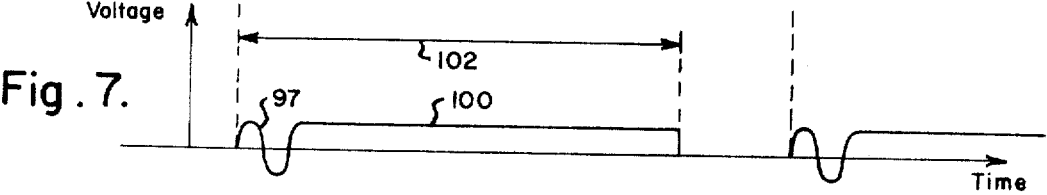
FIG. 7 is a similar graphic representation of the gap current corresponding to the gap voltage of FIG. 6.

Turning now to FIGS. 6 and 7 of the drawings, the effective increase in cutting time is illustrated graphically. FIG. 6 represents the variation in gap voltage with respect to time when using the charging circuit of FIG. 5, and is generally similar to FIG. 2 of the drawings with respect to the curve portions 42', 46' and 48' representing the dual charging rate of the capacitance and subsequent discharge thereof across the gap 10' as described previously. However, with the use of the pulse-prolonging circuit 90 as illustrated in FIG. 5, the gap voltage following each capacitance discharge may undergo a minimal oscillation 96 which is quickly terminated by the ensuing gap current flow described below. The pulse-prolonging circuit 90, which prevents the immediate reopening of switch 58', permits current to flow from the direct potential source 28' through the power charging resistance 26', and across the now-ionized gap 10', for the remainder of the unstable interval, as denoted by curve portion 100 (FIG. 7). During this period the bypassing or power-charging resistance 26', which is of lesser value than the primary or pilot charging resistance 24', serves as a current-limiting resistance to limit the discharge current through the gap 10' during the balance of each output interval of the pulse-prolonging circuit 90.

With this arrangement the total length of each cutting pulse, denoted in FIG. 7 by dimensional arrow 102, is much longer than the corresponding cutting pulse 38 of FIG. 2. Therefore, although the rate of repetitive capacitance discharge is reduced, the total effective cutting time as represented by dimensional arrow 102 (FIG. 7) and as compared to the dimensional arrow 38 (FIG. 2) is much increased. Moreover, a relatively constant gap voltage and current are obtained, as represented by the curve portions 98 and 100 respectively, during substantially the entire length of each cutting pulse 102, rather than the relatively ineffectual series of damped oscillations following the initial, cutting oscillations of each sparkover 48 of FIG. 2.

The initial oscillations of the gap voltage and current, represented by curve portions 96 and 97 respectively, are not necessary for the operation of the circuit of FIG. 5 and can be eliminated by employing a smaller value of discharge capacitance 20', as the smaller capacitance requires a larger value of pilot charging resistance 24' in order to maintain the same recovery-sensing operation of the circuit.

Figure 8:
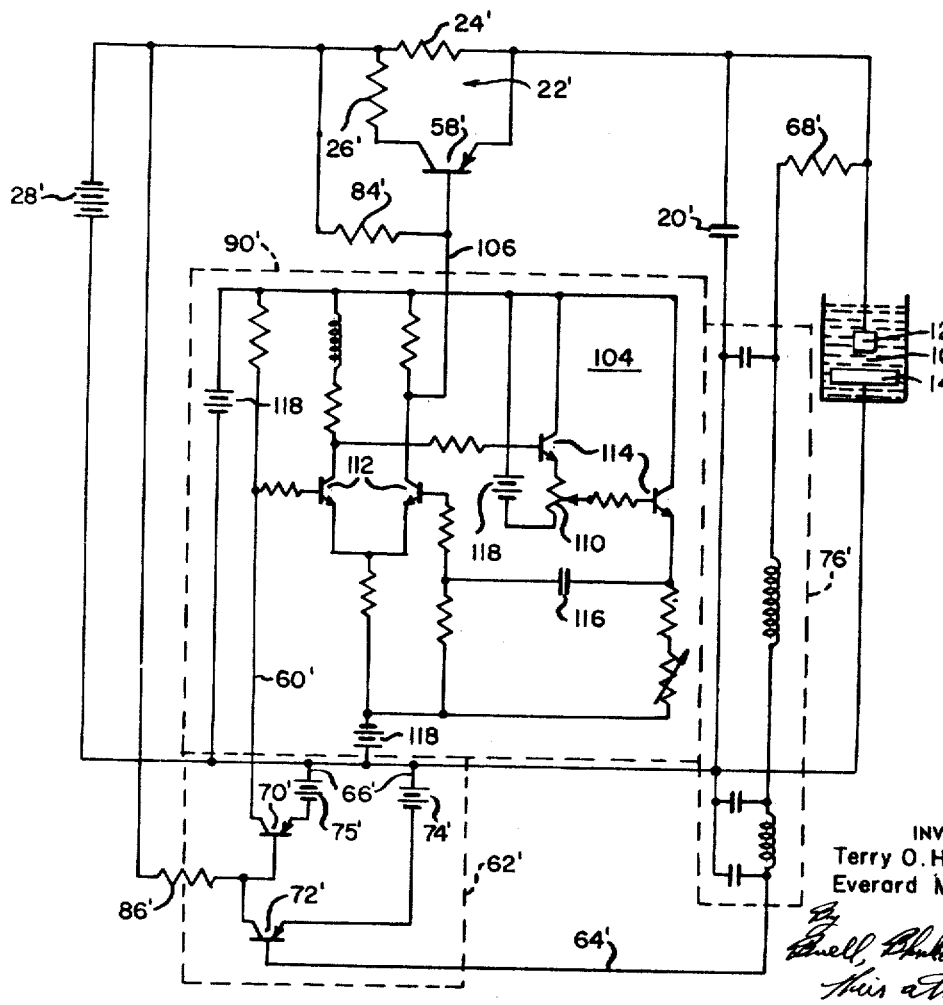
FIG. 8 is a schematic circuit diagram of still another form of the supply circuit of the invention and incorporating the operational principles of FIG. 5.

Referring now to FIG. 8 of the drawings, an exemplary form of the pulse-prolonging circuit 90' includes a monostable multivibrator circuit denoted generally by reference character 104. The multivibrator 104 in the circuit arrangement of FIG. 8 is shown in conjunction with the keying circuit 62' of FIG. 4. Other pulse-prolonging networks can be employed to delay the turnoff of the switch 58' (FIGS. 5, 8 and 9) as explained above, in order to obtain long duration cutting pulses.

As stated above, the multivibrator circuit 104 includes in this example a pair of push-pull transistors 112 which are alternately triggered on by pulses received on conductor 60'. The remaining transistors 114 extend the pulse duration or prolongation, while the unstable condition of the circuit 104 is determined primarily by the RC constant of capacitance 116 and variable resistance 110 and associated resistance. The circuit 104 returns to its stable condition when the capacitance 116 becomes fully charged. The transistors 112 and 114 are suitably biased by potential sources 118. Alternatively the biasing potentials can be supplied through a voltage dividing network from the primary potential source 28'.

The multivibrator circuit is triggered to its unstable condition upon receiving a pulse from the keying circuit 62' along conductor 60'. However, upon cessation of the keying circuit pulses at points 50' (FIG 6) the multivibrator circuit 104 continues to deliver a voltage on output conductor 106 to the base of the switching transistor 58' to maintain the transistor in its switch-closed condition for a predetermined time following the initial delivery of each pulse to the monostable multivibrator. This time is equal to the cutting pulse 102 (FIG. 7) plus the time from the point 52' (FIG. 6) at which the capacitance 20' begins its higher charging rate to its moment of discharge, and is denoted by dimensional arrow 108. The dimensional arrow 108 thus represents the "on" portions of the switching transistor 58' operating cycle. At the end of the interval denoted by arrow 108 the multivibrator circuit 104 returns automatically to its stable condition, in the known manner. A potentiometer or other variable resistance 110 is included in the multivibrator circuit 104 to adjust the length of its unstable interval 108.

The pulse-prolonging circuit of FIG. 8 in most applications increases the length of the cutting pulse by a factor in the order of 1,000. In the event that it is desired to prolong the cutting pulse at a lesser amount, for example, in the neighborhood of 20 to 100 times, the discharge circuit of FIG. 9 can be employed, wherein similar reference characters with primed accents are employed to denote similar components of FIG. 8 and the preceding figures as the case may be.

Figure 9:
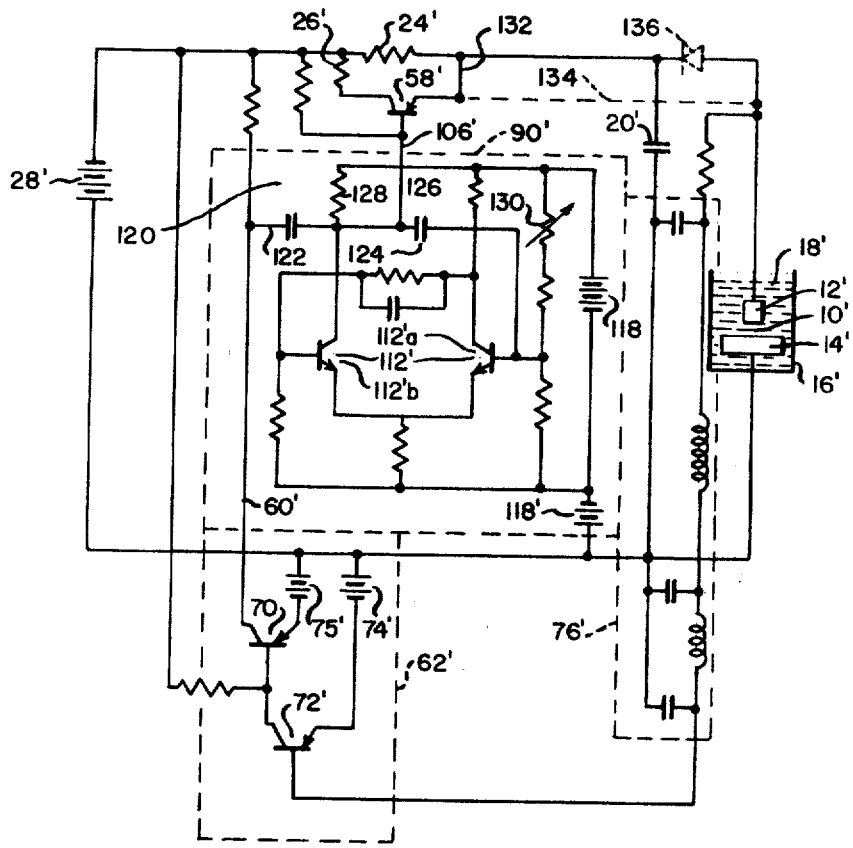
FIG. 9 is a schematic circuit diagram of still another form of the charging and sustaining circuit of the invention.

In the discharge circuit of FIG. 9 another form of monostable multivibrator circuit 120 is utilized as the pulse-prolonging means 90 and is coupled between the keying circuit 62' and the transistor switch 58'. The circuit 120 includes a pair of alternately conducting transistors 112', with the transistor 112'*a* being conductive under steady-state conditions. When a triggering pulse is received from the keying circuit 62' along conductors 60' and 122 transistor 112'*a* is cut off and transistor 112'*b* is turned on to produce the unstable circuit condition.

When the charge stored in capacitance 124 leaks off through resistances 126 and 128 and potentiometer 130, transistor 112'*a* becomes conducting again, and the circuit 120 reverts to its steady-state condition until the next triggering pulse occurs. The potentiometer or other variable resistance means 130 is used to control the length of the delay interval. During the delay interval a continuous pulse is applied to the base of the transistor 58' along conductor 106'. The circuit of FIG. 9 otherwise functions as described in connection with the circuit of FIG. 8.

In certain applications it may be desired to charge the capacitance 20' in the conventional fashion, while utilizing the pulse-prolonging circuit of the invention. In one arrangement for this purpose, conductor 132 of the switch means 58' is omitted, and the switch means are coupled directly to the EDM electrode 12' through an alternative circuit path indicated by dash-outlined conductor 134. At the same time, a circuit path between the resistance 26' (FIG. 9) and capacitance 20' is interdicted by directional diode 136 in series with the resistance 24'. In this arrangement, then, the power-charging function of the resistance 26' is eliminated and only its current-limiting function is retained. As a result the current flowing after the gap ionization induced by each capacitance discharge is limited throughout the cutting pulse.

Figure 10:
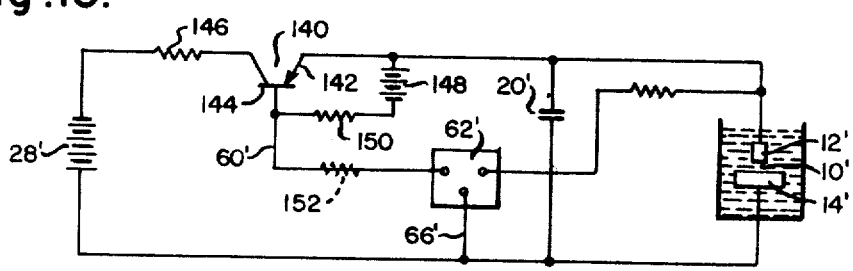
FIG. 10 is a schematic circuit diagram of another supply circuit of our invention and illustrating another form of the current limiting means.

Our invention contemplates other forms of variable current limiting means for the capacitance 20, or similar electrical storage means such as a storage inductance. For example, another form of variable current limiting means is shown in FIG. 10 of the drawings, which represents still another arrangement of our supply circuit which in certain respects is similar to that shown in FIG. 3. In FIG. 10, however, the dual charging resistances 24', 26' and the switching transistor 58 of FIG. 3 are replaced by a modification of our novel current limiting means which in this example includes a PNP power transistor 140, the emitter 142 of which is coupled to capacitance 20'. In one operative scheme of the FIG. 10 arrangement signal and bias means are coupled to base 144 of the transistor 140 for rendering the transistor 140 either "full on" or "partly on". In other applications, where it may be desirable to substantially terminate the flow of charging current to the capacitance 20' at certain times it is contemplated that additional circuit means (not shown) can be provided to terminate the signal or bias supplied to the transistor base 144 or otherwise to render the transistor 140 "full off" as required.

When the transistor 140 is full on, it introduces relatively little resistance into the circuit so that the charging rate of the capacitance 20' is determined by the RC constant determined by a resistance 146 in series with the transistor 140 and the voltage source 28'. Accordingly, the resistance 146 together with the relatively small added resistance of the transistor 140 in its full on condition corresponds to the rapid or power charging rate of the capacitance 20' as controlled by the bypassing resistance 26' of FIG. 3 and the associated switching transistor 58, when the latter is turned on. The transistor 140 similarly is switched to its full on condition by the keying circuit 62' which periodically supplies a sufficiently negative potential to the transistor base 144 through output conductor 60'. Such application of negative potential as to render the transistor 140 full on is supplied b output pulses of the keying circuit 62' at intervals when the gap 10' has deionized sufficiently after each discharge thereacross to permit the more rapid build up of voltage in the capacitance 20'. The keying circuit 62' therefore is actuated and controlled by the gap voltage in the manner described above in connection with FIGS. 3 and 4 of the drawings.

On the other hand, the slower or pilot charging rate of the capacitance 20' is defined by the resistance 146 plus the substantial resistance of the emitter-collector circuit of the transistor 140 in its partly on condition. This charging rate of the capacitance 20' takes place during the initial portion 42 of its charging cycle before the gap 10' has sufficiently deionized after each gap discharge, as set forth above in connection with FIG. 2. This prevents the capacitance 20' from being charged faster than the rate of recovery of the discharge gap 20 permits. However, during these intervals no output pulse is being emitted by the keying circuit 62' so that the transistor otherwise would return to its full off condition except for the provision of means, in accordance with our invention for maintaining the transistor 140 in an intermediate conductive or partly on condition. We prefer to accomplish this by providing biasing means which are periodically overridden by the output pulses of the keying circuit 62' when the latter turns the transistor 140 full on and which otherwise maintains sufficient current in the transistor base 144 to maintain the transistor 140 in a partly on condition.

One form of such biasing means includes a voltage source 148 and load resistance 150 coupled between the collector 142 and the base 144 of the transistor 140. Thus, when the keying circuit 62' attempts to turn the power transistor 140 full off the voltage source 148 and resistance 150 maintain a predetermined amount of base current in the transistor which corresponds to the partly on condition thereof. This bias current is correspondingly less than the summation of the bias current plus the base current intermittently produced by the output pulses of the keying circuit 62' to the extent that the partly on resistance of the transistor 140 is greater than the full on resistance thereof. Accordingly, it will be apparent that the potential source 148 can be varied to produce a slow or very slow initial charging rate of the capacitance 20' as desired.

In another arrangement of our current limiting circuit, it is contemplated that the charging resistance 146 can be omitted altogether and a suitable resistance 152 (FIG. 10) can be coupled in output conductor 60' or other suitable means (not shown) provided to correspondingly reduce the amplitude of the keying circuit output pulses. Thus, the transistor 140 will be placed in a first partly on condition corresponding to the power charging rate where the emitter-collector circuit thereof has a resistance corresponding substantially to the resistance 146 during the interval of each output pulse. Then, when the keying circuit 62' attempts to turn the transistor 140 to the full off condition the biasing circuit 148—150 will place the transistor 140 in a second partly on condition of greater resistance corresponding to the pilot or slower charging rate.

In FIG. 11 of the drawings, the aforementioned conductivity states of the power transistor 140 are illustrated graphically. In FIG. 11 the positive abscissa direction denotes increasing collector voltage and increasing emitter-collector resistance while the positive ordinate direction denotes increasing collector current. The family of curves 154 denote the variations in collector voltage and current for various values of base current, with the base current increasing in the upward direction generally of the graph as viewed in FIG. 11. On the other hand, the curve 156 denotes a lineal change in emitter-collector resistance between the "full on" condition of relatively low resistance denoted by point A and the "full off" condition of relatively high resistance denoted by point C. The intersections of the constant base current curves 154 respectively with the resistance curve 156, denote the base current that must be maintained in the transistor base 154 in order to attain a given resistance, represented by the "partly on" points $B_1$ or $B_2$, which is a desired or predetermined percentage of the "full off" resistance corresponding to point C.

Accordingly, the intersection of resistance curve 156 with base current curve 154$a$ at point A represents the desired "full on" condition of the transistor 140 during each output pulse interval of the keying circuit 62' and denotes that transistor base current, corresponding to the value of curve 154$a$, which must be induced by the summation of the keying circuit signal and the biasing circuit voltage. The location of point A represents very little collector voltage and correspondingly little emitter-collector resistance added to the resistance 146. This represents the rapid or power charging rate of the capacitance 20' as aforesaid.

On the other hand, when the keying circuit 62' attempts to establish a "full off" condition in the transistor 140 as denoted by point C, the transistor is turned to its "partly on" condition represented by point $B_1$. This corresponds to the pilot or slow capacitance charging rate as aforesaid. The intersection of base current curve 154$b'$ at $B_1$ with the resistance curve 156 denotes the base current which is maintained by the biasing circuit 148—150 in order to attain the desired resistance at point $B_1$ in the emitter-collector circuit of the transistor 140.

In the alternative arrangement of our current limiting means of FIG. 10, where the resistance 146 is omitted, the keying circuit 62' is arranged to supply an output pulse which, with the biasing circuit voltage, produces the transistor base current corresponding to the curve 154$b''$ which in turn produces a second "partly on" condition of the transistor 140 corresponding to the point $B_2$ where the resistance curve 156 intersects the base current curve 154$b''$. The point $B_2$, of correspondingly lower resistance than that of $B_1$, corresponds to the power charging rate of the capacitance 20' as determined by the current limiting means whereat the transistor 140 supplies substantially all of the rapid charging resistance in the absence of the resistor 146. In the latter arrangement the transistor conductivity is alternated between that represented by points $B_2$ and $B_1$ rather than points A and $B_1$.

From the foregoing it will be apparent that novel and efficient forms of power supply circuits for EDM apparatus have been disclosed herein. The disclosed power circuits function very successfully not only to increase machining speeds, as a result of shortened charging times and higher repetitive discharge rates, but also to limit short circuit currents, eliminate arcing conditions and electrode heating, and in general to reduce the time and work required for a given EDM application.

Although the invention has been described with particular reference to EDM applications, it will be obvious that our novel capacitance charging circuit is of general utility wherever it is necessary or desirable to impart differing charging rates to electric storage means. Therefore, while we have shown and described certain presently preferred embodiments of the invention and have illustrated presently preferred methods of practicing the same, it is to be distinctly understood that the invention is not limited thereto but may be otherwise variously embodied and practiced within the scope of the following claims.

We claim:

1. In an electric discharge machining system and the like, the combination including storage capacitance means capable of discharging when an electrode tool and a workpiece in an insulating medium are connected thereacross and are so spaced that the stored capacitance voltage exceeds the breakdown voltage of the insulating medium in a discharge gap between said tool and said workpiece, circuit means for charging said capacitance means from a source of unidirectional potential, a charging impedance network in series with said capacitance means, said network including a slower charging impedance capable of charging said capacitance at a slow rate while said gap is de-ionizing and a faster charging impedance coupled in parallel therewith, switching means coupled in series with said faster charging impedance, and circuit means coupled to said switching means and to said tool and workpiece for closing said switching means when said gap has de-ionized sufficiently following each discharge thereacross to permit a substantially faster capacitance charging rate.

2. The combination according to claim 1 wherein said switching means include an electronic switching device and said circuit means are capable of turning on said switching device when the gap voltage has attained a predetermined value.

3. The combination according to claim 2 wherein said electronic device is a semiconductive switch having emitter, collector and base components, additional circuit means are provided for coupling said base to the output of said potential source to apply the biasing potential to said base, said biasing potential being normally sufficient to turn said semiconductor switch on, said base being also coupled to said first-mentioned circuit means with said first-mentioned circuit means being arranged to bypass said potential during those times when said discharge gap is ionized so that said discharge gap and capacitance in parallel are fed current solely by said slower charging resistance until said gap substantially de-ionizes.

4. The combination according to claim 2 wherein said circuit means includes current-limiting resistance means and a low-pass filter network so that higher frequency oscillatory gap discharges are eliminated from said circuit means.

5. The combination according to claim 2 wherein said circuit means includes a source of biasing unidirectional potential coupled across said discharge gap in bucking relationship to the voltage developed thereacross by said capacitance means so that the initial portion of each capacitance charging cycle is controlled by said slower charging resistance and the remaining portion of each said cycle is controlled by said faster charging resistance.

6. The combination according to claim 1 wherein a keying circuit is included for intermittently opening and closing said switching means, said keying circuit being coupled to said tool and said workpiece and to said switching means so that the gap voltage developed across said tool and workpiece by said capacitance means activates said keying circuit to close said switch means when a predetermined level of voltage across said gap is attained.

7. The combination according to claim 6 wherein said switching means is biased to its conductive condition by connection to the output of said potential source, and said keying circuit includes a biased transistor device and a circuit coupled to the base thereof and to one of said workpieces and said tool for rendering said transistor device conductive when the discharge gap voltage falls below a predetermined level, said transistor device being coupled to said switching means and to the biased potential connection thereto to afford an opposing current path for said transistor bias when said transistor device is conductive so that said switching means are opened when said gap voltage is below said predetermined value, the biasing potential applied to said switching means from said potential source being otherwise operable to close said switching means when said gap voltage is above said predetermined value to thereafter apply a rapid charging rate to said capacitance means.

8. The combination according to claim 7 wherein the value of said slower charging resistance is selected such that said discharge gap has sufficiently de-ionized or recovered when said gap voltage has reached said predetermined value.

9. The combination according to claim 7 wherein said switching means includes a transistor type device, said keying circuit includes a pair of transistor type devices coupled in a common-emitter type circuit with the base of one of said common-emitter transistors being coupled to one output terminal of said capacitance means, the emitters of both of said common-emitter transistors being coupled to the other output terminal of said capacitance means, the bases of said switching transistors and of one of said common-emitter transistors being coupled to said potential source, and the collectors of both of said common-emitter transistors being coupled to a source of opposing bias potential so that a cutoff potential is applied to the base of said switching transistor to decouple said faster charging resistance from said capacitance means during each time interval in which said discharge gap has not sufficiently de-ionized to permit application of a faster charging rate to said capacitance.

10. The combination according to claim 9 wherein a potential source is coupled in the emitter circuit of each of said common-emitter transistors in bucking relation to said supply potential source to determine the gap voltage level at which said switching transistor is turned on to initiate the higher charging rate portion of each charging cycle of said capacitance means.

11. In an electric discharge machining system and the like, the combination including storage capacitance means capable of discharging when an electrode tool and a workpiece in an insulating medium are connected thereacross and are so spaced that the stored capacitance voltage exceeds the breakdown voltage of the insulating medium in a discharge gap between said tool and said workpiece, a circuit means coupled to said capacitance means and to a source of unidirectional potential for charging said capacitance means, said circuit means including first and second capacitance charging means, and switching means sensitive to the ionization of said gap and coupled to said circuit means for selectively connecting one of said first and said second charging means to said capacitance means in charging relationship therewith when said gap is de-ionizing and for connecting the other of said first and said second charging means to said capacitance means when said gap is not de-ionizing.

12. The combination according to claim 1 wherein pulse-prolonging circuit means are coupled between said closing circuit means and said switching means for maintaining a switch-closed condition for a predetermined interval following each closure of said switching means by said closing circuit means.

13. The combination according to claim 6 wherein pulse-prolonging circuit means are coupled between said keying circuit and said switching means, said pulse-prolonging circuit means being capable of maintaining said switching means in the closed condition thereof for a predetermined interval after said gap voltage attains said predetermined level of voltage.

14. In an electric discharge machining system and the like, the combination including storage capacitance means capable of discharging when an electrode tool and a workpiece in an insulating medium are connected thereacross but are so spaced that the stored capacitance voltage exceeds the breakdown value of the insulating medium, circuit means coupled to said capacitance and to a source of unidirectional potential, said circuit means including first and second capacitance charging means, switching means sensitive to the de-ionization of said gap and coupled to said circuit means for selectively connecting said first and said second charging means to said capacitance in charging relationship therewith, and pulse-prolonging circuit means coupled to said switching means to maintain one of said capacitance charging means in connection with said electrode and said workpiece for a predetermined interval before the other of said capacitance charging means are coupled to said capacitance by said switching means.

15. The combination according to claim 14 wherein said pulse-prolonging circuit means include a monostable multivibrator circuit.

16. In an electric discharge machining system and the like, the combination including storage capacitance means capable.

17. A dual rate charging circuit for an electric storage device, said charging circuit including a current-limiting network coupled to said device and to a source of unidirectional potential, said current-limiting network being coupled solely in a charging path of said device and being electrically separated from a discharge path of said device including a lower current circuit and a higher current circuit coupled in parallel therewith, and switching means sensitive to a temporarily low impedance in said discharge path and coupled to said current-limiting network for successively connecting said lower current circuit and said higher current circuit to said device in charging relationship therewith so that said lower current circuit is operable contemporaneously with said low impedance and said higher current circuit is operable during a higher impedance interval in said discharge path.

18. The combination according to claim 17 wherein said current-limiting network includes a power transistor capable of having dual conductivity levels established therethrough to form said higher and said lower current circuits respectively and said switching means are coupled to the base of said transistor for selectively establishing said levels of conductivity through said transistor.

19. The combination according to claim 17 wherein said switching means are connected in series with said higher current circuit in bypassing relation to said lower current circuit during said higher impedance interval.

20. The combination according to claim 17 wherein said switching means include a switching transistor series-connected within said higher current circuit in bypassing relation to said lower current circuit.

21. In an electric discharge machining system and the like, the combination comprising storage capacitance means capable of discharging when an electrode tool and a workpiece in an insulating medium are connected thereacross and are so spaced that the stored capacitance voltage exceeds the breakdown voltage of the insulating medium in a discharge gap between said tool and said workpiece, circuit means for charging said capacitance means from a source of unidirectional potential, charging impedance means in series with said capacitance means, a pulse-prolonging circuit coupled to said tool and said workpiece in bypassing relation to said charging impedance means, switching means coupled in said pulse-prolonging circuit, and circuit means forming part of said pulse-prolonging circuit for closing said switching means for a predetermined interval following each discharge of said capacitance means to prolong the flow of discharge current across said gap upon ionization by said discharge.

UNITED STATES PATENT OFFICE
CERTIFICATE OF CORRECTION

Patent No. 3,549,851

December 22, 1970

Terry O. Hockenberry et al.

It is certified that error appears in the above identified patent and that said Letters Patent are hereby corrected as shown below:

Column 4, line 38, "the", second occurrence, should read -- to --; line 56, after "de-ionize" insert a period. Column 7, line 34, "tantamounk" should read -- tantamount --; line 55, "transistor" should read -- the --. Column 10, line 9, after "supplied" "b" should read -- by --; line 26, "20" should read -- 10 --. Column 14, line 12, after "capable " insert -- discharging when an electrode tool and a workpiece in an insulating medium are connected thereacross but are so spaced that the stored capacitance voltage exceeds the breakdown value of the insulating medium, circuit means coupled to said capacitance and to a source of unidirectional potential, said circuit means including capacitance charging means and gap-current limiting means coupled in parallel relation across said electrodes, switching means coupled in series with said current limiting means and said electrodes, and gap voltage sensitive means and sustaining circuit means coupled to said switching means for closing said switching means at a time near the discharge point of said capacitance means and for providing a current path through said current limiting means and across said gap when ionized as a result of said discharge and for a predetermined interval following said discharge, whereby machining pulses of long duration are obtained --.

Signed and sealed this 4th day of May 1971.

(SEAL)
Attest:

DWARD M. FLETCHER, JR.
Attesting Officer

WILLIAM E. SCHUYLER, JR.
Commissioner of Patents